United States Patent [19]

Montpetit

[11] Patent Number: 4,627,648
[45] Date of Patent: Dec. 9, 1986

[54] PIPE SADDLE JOINT AND ASSEMBLY

[75] Inventor: Jean Montpetit, Boucherville, Canada

[73] Assignee: Uroplast Inc., Longueuil, Canada

[21] Appl. No.: 806,514

[22] Filed: Dec. 9, 1985

[51] Int. Cl.⁴ ............................................. F16L 41/08
[52] U.S. Cl. .................................. 285/197; 285/158; 285/194; 285/205
[58] Field of Search ............... 285/197, 910, 915, 194, 285/205, 206, 210, 158

[56] References Cited

U.S. PATENT DOCUMENTS

| | | |
|---|---|---|
| 3,364,939 | 1/1968 | Valenziano . |
| 3,471,176 | 11/1969 | Gilchrist . |
| 3,635,503 | 1/1972 | Rafalski, Jr. . |
| 3,687,490 | 8/1972 | Dunmire ............................ 285/197 |
| 3,730,565 | 5/1973 | Steudler, Jr. . |
| 3,762,743 | 10/1973 | Hawle ................................ 285/197 |
| 3,779,272 | 12/1973 | Dunmire ............................ 285/197 |
| 3,792,879 | 2/1974 | Dunmire et al. .................. 285/197 |
| 3,863,937 | 2/1975 | Silverman et al. ................ 285/197 |
| 3,870,064 | 3/1975 | Vigneron .......................... 285/197 |
| 3,981,061 | 9/1976 | Jackson et al. .................... 285/197 |
| 4,073,513 | 2/1978 | Blakeley ............................ 285/197 |
| 4,078,833 | 3/1978 | Carter ................................ 285/199 |
| 4,441,744 | 4/1984 | Oostenbrink et al. ............. 285/197 |

FOREIGN PATENT DOCUMENTS 2118264 10/1983 United Kingdom ................ 285/194
2120340 11/1983 United Kingdom ................ 285/197

Primary Examiner—Cornelius J. Husar
Assistant Examiner—Douglas W. Hanson
Attorney, Agent, or Firm—Robic, Robic & Associates

[57] ABSTRACT

A saddle joint assembly is disclosed which comprises a branch pipe and a main pipe disposed at right angles to one another, the main pipe having a hole through its wall facing one end of the branch pipe, the assembly including a saddle joint interconnecting the pipes. The latter joint has a branch pipe insertion part and a main pipe connecting part coaxial with the insertion part, the parts defining an inward shoulder therebetween and the connecting part being mounted in the wall hole of the main pipe while the branch pipe is mounted in the insertion part. The connecting part has bolt passages that extend between the shoulder and its outer end. An equal number of L-shaped anchor bolts, each having a stem portion threaded at one end and a bent portion at the other end are provided, the stem portions extending through the bolt passages while the threaded ends project above the inward shoulder, the bent ends facing the bore. Nuts are screwed over the threaded ends of the bolts so as to force the bent ends against the main pipe bore whereby to clamp the saddle joint against the main part.

16 Claims, 3 Drawing Figures

PIPE SADDLE JOINT AND ASSEMBLY

FIELD OF THE INVENTION

The present invention relates to an improved pipe saddle joint and to an assembly including such an improved joint, the latter interconnecting a branch pipe to a main pipe, around a hole through the main pipe wall. Such an assembly is used in sewer and water distribution systems, particularly domestic.

RELATED ART AND OBJECTS OF THE INVENTION

Joints of the above type do of course presently exist but most of them have to be strapped around the main pipe which requires that the circumferential area about the hole through the main pipe be dug out for positioning the strap holding the saddle joint against the main pipe. In some cases, the saddle joint is glued with an epoxy resin which is not entirely secure and which also requires that fixing of the joint over the main pipe be done when the temperature is neither too hot nor too cold. In both cases, the making of the joint is not satisfactory.

It is therefore a main object of the invention to provide an improved pipe saddle joint and assembly that avoid the above disadvantages by solidly securing the joint over the main pipe while not requiring that the relevant part of the latter be freed from earth surrounding it in the area of the hole with which the branch pipe is aligned.

A prior art search has been made which has revealed the following U.S. Pat. Nos.:

3,364,939 of 1968
3,471,176 of 1969
3,635,503 of 1972
3,730 565 of 1973
3,779,272 of 1973
4,441,744 of 1984

Most of the above patents refer to saddle joints that are clamped over the main pipe by means of a strap device which winds around the full periphery of the pipe thus requiring digging around it. Typical of this type of joints are the ones disclosed in U.S. Pat. Nos. 3,471,176 and 3,779,272.

On the other hand, U.S. Pat. No. 4,441,744 does disclose a saddle joint which can be secured over a main pipe without requiring the use of a strap surrounding the periphery of the main pipe. However, the saddle pipe joint requires several structurally complex cooperating parts that are costly to manufacture and present many difficulties in securing over the main pipe.

SUMMARY OF THE INVENTION

The present invention is an improvement over the pipe saddle joints and assemblies of the above patents and comprises a tubular body including a branch pipe insertion part and a main pipe connecting part coaxial with the insertion part, these parts defining a shoulder inwardly of the body. The connecting part has several bolt passages that extend between this inward shoulder and its outer end. The saddle joint is clamped into position by means of L-shaped anchor bolts wherein each has a stem portion threaded at one end and a bent portion at the other end, each stem portion extending through one bolt passage with its threaded end projecting above the inward shoulder. Bolt nuts are screwed over the threaded ends. Once the pipe saddle joint is inserted into the main pipe hole with the bent ends of the bolts turned inwardly, the latter are turned outwardly to face the bore of the main pipe and the nuts are rotated to forcibly apply the bent ends of the bolts against the bore of the main pipe thus securely clamping the saddle joint in position. Other types of bolt tightening means may be used.

BRIEF DESCRIPTION OF THE DRAWING

A description of a preferred embodiment of the invention now follows having reference to the appended drawing wherein.

Figure 1:
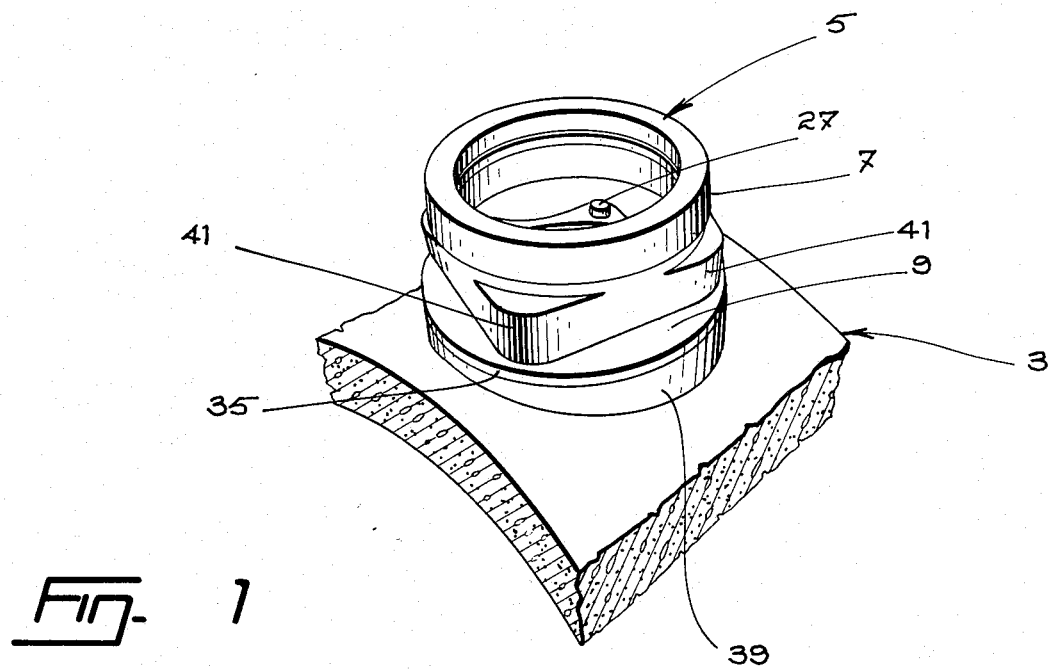
FIG. 1 is a perspective view of a saddle joint applied over a main pipe only a portion of which is shown.

Referring to the drawing, there is shown a saddle joint assembly including a branch pipe 1 that can be made of plastic material such as polyvinyl chloride; a main pipe 3 that can be made of concrete and a saddle joint 5 also preferably made of polyvinyl chloride. These elements can of course be made of other material. As shown, the branch pipe 1 and the main pipe 3 are disposed at right angles to one another.

The saddle joint 5 is an essentially tubular body including a pipe insertion part 7, into which the branch pipe 1 is received, and a main pipe connecting part 9 coaxial with the part 7. Radial shoulder means 11 separate the insertion part 7 and the connecting part 9. The connecting part 9 is slid into a hole 13 through the wall of the main pipe 3.

A series of axial elongated bulges 15, four being shown, project inwardly from the bore 17 of the connecting part 9. Each axial bulge 15 is pierced with a through passage 19 extending between an upper shoulder end 21, merging with the shoulder means 11, and an outer lower end 23 merging with the corresponding end of the connecting part 9. The upper ends 21 of the bulges 15 may be interconnected by an inward circumferential flange 25 of the shoulder means 11, although flange 25 can be omitted, as will be seen hereinafter.

The clamping action of the saddle joint 5 to the main pipe 3 is obtained by means of L-shaped anchor bolts 27, equal in number to that of the passages 19. Each bolt 27 has a stem portion 29, threaded at its upper end, and a bent portion 31 at its lower end. The stem portions extend slidably through the passages 19 and their threaded ends project above the upper shoulder ends 21 formed by the top surface of the axial bulges 15. Rotary anchor bolt nuts 33 are provided at the threaded ends of the stem portions 29.

Figure 2:
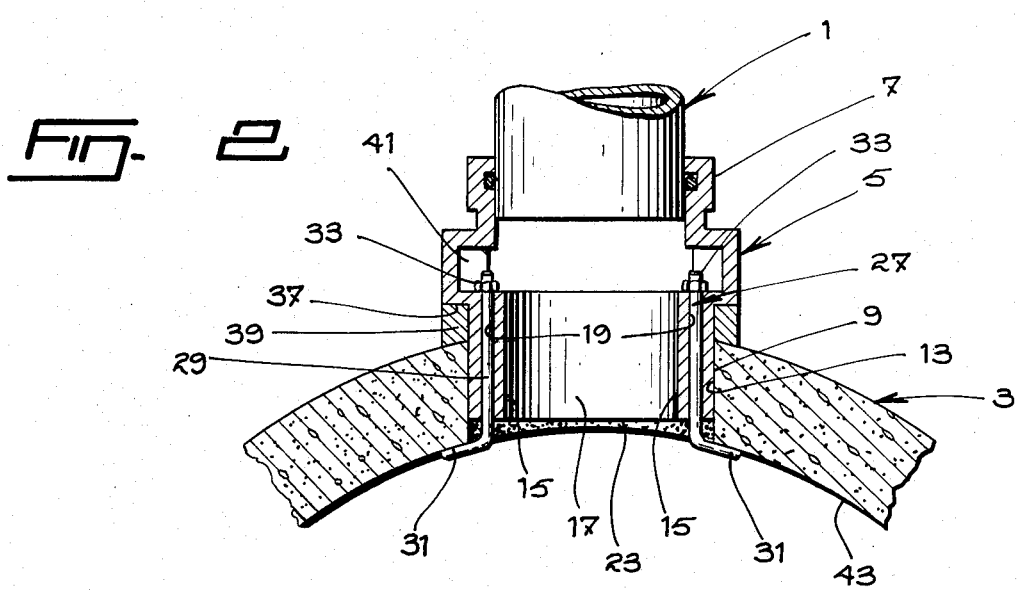
FIG. 2 is a transverse cross-sectional view of the assembly of FIG. 1.
Figure 3:
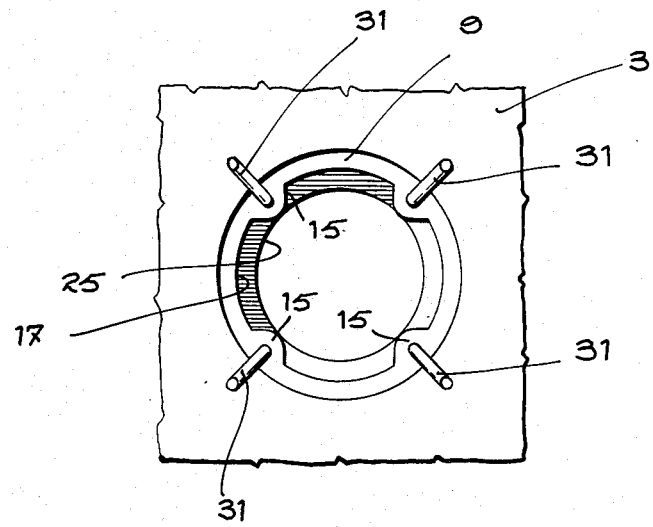
FIG. 3 is a plan view taken from the inside of the main pipe.

The body of the joint part 7 is, outwardly and at its lower end, essentially cylindrical and in the form of a ring 35, having an outer diameter which is larger than the outer diameter of the connecting part 9, as best seen in FIG. 2. There is thus defined, between the ring 35 and the connecting part 9, an outward radial shoulder 37. A sealing ring 39, made of neoprene for instance, is mounted outwardly of and around the connector part 9, having a flat top surface which is applied against the outward radial shoulder 37 and an adaptor surface, opposite the flat surface, which is configured for adaptably sitting over the cylindrical outer surface around the hole 13 of the main pipe 3. The configuration of this adaptor surface of the sealing ring 39 is such that it can be applied over a wide range of main pipes 3 since the latter are rather quite large with reference to the ring and the latter, being made of resilient material, can easily adapt itself to the outer surface of the pipe 3, under pressure.

In order to avoid accumulation of detritus in the saddle joint 5, the lower end of the branch pipe insertion part 7 may advantageously be formed with outwardly bulging generally triangular cavities 41 into which can be lodged at least the major part of the bulges 15 and the threaded ends of the bolts 27 with the locking nuts 33.

As can readily be appreciated from the above description, in use the sealing ring 39 is mounted into position against the outward shoulder 37; the stem portions of the bolts 29 are slid into their respective passages 19 and the nut 33 screwed at the top of the stem portions 29. The bent portions 31 of the anchor bolts 27 are thereafter turned inwardly of the main pipe connector 9, the main pipe connecting part 9 is slid into the hole 13 of the main pipe 3 with the adaptor surface of the sealing ring 39 sitting over the outer surface of the main pipe 3 and the bent portions 31 are then turned toward the bore 43 of the pipe 3. Clamping is then obtained by additional rotation of the nuts 33 until the saddle 5 is firmly secured to the pipe 3. The branch pipe 1 may then be slid into the insertion part 7 of the saddle joint 5 in the usual manner.

There will of course be appreciated that the stem portions 29 of the bolts 27 have a length amply sufficient for easily locating the bent portions 31 inside the pipe 3 when the saddle joint 5 is in position.

To the man skilled in the art, it will be appreciated that the threaded ends of the bolt stems 29 and the nuts 33 may be replaced by other bolt tightening means suitable to move the stem portions lengthwise whereby to clamp the turned ends 33 against the bore 43.

I claim:

1. A pipe saddle joint comprising:
   an essentially tubular body having a longitudinal axis and including a branch pipe insertion part and a main pipe connecting part coaxial with said insertion part; said parts defining radial shoulder means therebetween, inwardly of said body, and said connecting part having an outer end located away from said inward shoulder means;
   said connecting part being formed with at least two bolt passages extending between said shoulder means and said outer end;
   two L-shaped anchor bolts, each having a stem portion threaded at one end and a bent portion at the other end; each of said stem portions extending through one of said passages with the threaded end thereof projecting above said inward shoulder means, said bent ends facing said outer end, and
   a pair of bolt nuts, each screwed over one of said threaded ends.

2. A joint as claimed in claim 1, wherein said body is, outwardly, essentially cylindrical and said insertion part has a larger outer diameter than the outer diameter of said connecting part, an outward radial shoulder being thus defined therebetween; said joint further comprising a sealing ring mounted outwardly of and around said connecting part, said sealing ring having a flat surface applied against said outward radial shoulder and an adapter surface, opposite said flat surface, said adapter surface being configured for adaptably sitting over a cylindrical surface.

3. A joint as claimed in claim 1, comprising four bolt passages and four L-shaped anchor bolts evenly distributed about said inward shoulder means.

4. A joint as claimed in claim 2, comprising four bolt passages and four L-shaped anchor bolts evenly distributed about said inward shoulder means.

5. A saddle joint assembly comprising:
   a branch pipe and a main pipe disposed at right angles to one another, said main pipe having a bore and a hole through the wall thereof, said hole facing one end of said branch pipe and being circumscribed at one end by said bore;
   a saddle joint interconnecting said pipes, said saddle joint comprising:
      an essentially tubular body having a longitudinal axis and including a branch pipe insertion part and a main pipe connecting part coaxial with said insertion part; said parts defining radial shoulder means therebetween, inwardly of said body, and said connecting part having an outer end away from said shoulder means; wherein said connecting part is mounted in said wall hole of said main pipe and said branch pipe is mounted in said insertion part;
   said connecting part being formed with at least two bolt passages extending between said shoulder means and said outer end;
   two L-shaped anchor bolts, each having a stem portion threaded at one end and a bent portion at the other end; each of said stem portions extending through one of said passages with the threaded end thereof projecting above said shoulder means, said bent ends facing said bore, and
   a pair of bolt nuts, each being screwed over one of said threaded ends of said bolts, whereby said bent ends are forced against said bore of said main pipe to clamp said saddle joint against said main pipe.

6. An assembly as claimed in claim 5, wherein said body is, outwardly, essentially cylindrical and said insertion part has a larger outer diameter than the outer diameter of said connecting part, an outward radial shoulder being thus defined therebetween; said assembly further comprising a sealing ring mounted outwardly of and around said connecting part, said sealing ring having a flat surface applied against said outward radial shoulder and an adapter surface, opposite said flat surface, said adapter surface being configured for adaptably sitting over the outer surface of said main pipe around said wall hole.

7. An assembly as claimed in claim 5, comprising four bolt passages and four L-shaped anchor bolts evenly distributed about said inward shoulder means.

8. An assembly as claimed in claim 6, comprising four bolt passages and four L-shaped anchor bolts evenly distributed about said inward shoulder means.

9. A joint as claimed in claim 2, wherein said inward shoulder means are located in cavities formed in said insertion part of said body and in which said threaded ends of said anchor bolts and said nuts are lodged.

10. An assembly as claimed in claim 6, wherein said inward shoulder means are located in cavities formed in said insertion part of said body and in which said threaded ends of said anchor bolts and said nuts are lodged.

11. A joint as claimed in claim 9, wherein said bolt passages are parallel to said longitudinal axis of said body.

12. An assembly as claimed in claim 10, wherein said bolt passages are parallel to said longitudinal axis of said body.

13. A pipe saddle joint comprising:
an essentially tubular body having a longitudinal axis and including a branch pipe insertion part and a main pipe connecting part coaxial with said insertion part; said parts defining radial shoulder means therebetween, inwardly of said body, and said connecting part having an outer end located away from said inward shoulder means;
said connecting part being formed with at least two bolt passages extending between said shoulder means and said outer end;
two L-shaped anchor bolts, each having a stem portion and a bent portion; each of said stem portions extending through one of said passages with one end thereof projecting above said inward shoulder means, said bent ends facing said outer end, and
bolt tightening means at said one end of said stem portions, coacting with said shoulder means, for moving said stem portions lengthwise.

14. A joint as claimed in claim 13, wherein said body is, outwardly, essentially cylindrical and said insertion part has a larger outer diameter than the outer diameter of said connecting part, an outward radial shoulder being thus defined therebetween; said joint further comprising a sealing ring mounted outwardly of and around said connecting part, said sealing ring having a flat surface applied against said outward radial shoulder and an adapter surface, opposite said flat surface, said adapter surface being configured for adaptably sitting over a cylindrical surface.

15. A saddle joint assembly comprising:
branch pipe and a main pipe disposed at right angles to one another, said main pipe having a bore and a hole through the wall thereof, said hole facing one end of said branch pipe and being circumscribed at one end by said bore;
a saddle joint interconnecting said pipes, said saddle joint comprising:
an essentially tubular body having a longitudinal axis and including a branch pipe insertion part and a main pipe connecting part coaxial with said insertion part; said parts defining radial shoulder means therebetween, inwardly of said body, and said connecting part having an outer end away from said shoulder means; wherein said connecting part is mounted in said wall hole of said main pipe and said branch pipe is mounted in said insertion part;
said connecting part being formed with at least two bolt passages extending between said shoulder means and said outer end;
two L-shaped anchor bolts, each having a stem portion and a bent portion; each of said stem portions extending through one of said passages with one end thereof projecting above said inward shoulder, said bent ends facing said bore, and
bolt tightening means at said one end of said stem portions, coacting with said shoulder means, for moving said stem portions lengthwise, whereby said bent ends are forced against said bore of said main pipe to clamp said saddle joint against said main pipe.

16. An assembly as claimed in claim 15, wherein said body is, outwardly, essentially cylindrical and said insertion part has a larger outer diameter than the outer diameter of said connecting part, an outward radial shoulder being thus defined therebetween; said assembly further comprising a sealing ring mounted outwardly of and around said connecting part, said sealing ring having a flat surface applied against said outward radial shoulder and an adapter surface, opposite said flat surface, said adapter surface being configured for adaptably sitting over the outer surface of said main pipe around said wall hole.

* * * * *